United States Patent [19]

Suzuki

[11] 4,398,278
[45] Aug. 9, 1983

[54] RECORD PLAYER PROGRAM SELECTOR

[75] Inventor: Kiyoshi Suzuki, Tokyo, Japan

[73] Assignee: Sony Corporation, Tokyo, Japan

[21] Appl. No.: 331,074

[22] Filed: Dec. 16, 1981

[30] Foreign Application Priority Data

Dec. 27, 1980 [JP] Japan .......................... 55-191607[U]

[51] Int. Cl.³ ............................ G11B 7/00; G11B 3/00
[52] U.S. Cl. ........................................ 369/33; 369/41;
369/75
[58] Field of Search ....................... 369/30, 33, 41, 75,
369/178, 221, 222, 228

[56] References Cited

U.S. PATENT DOCUMENTS

| | | | |
|---|---|---|---|
| 2,952,464 | 9/1960 | Stimler | 369/41 |
| 3,937,903 | 2/1976 | Osann, Jr. | 369/41 |
| 4,093,832 | 6/1978 | Isaacson et al. | 369/41 |
| 4,114,893 | 9/1978 | Leach et al. | 369/41 |
| 4,226,425 | 10/1980 | Juso | 369/33 |
| 4,260,162 | 4/1981 | Morri et al. | 369/41 |
| 4,301,526 | 11/1981 | Morri et al. | 369/33 |

*Primary Examiner*—Steven L. Stephan
*Assistant Examiner*—Hezron Williams

*Attorney, Agent, or Firm*—Lewis H. Eslinger; Alvin Sinderbrand

[57] ABSTRACT

A program selector for a record player of the type having a turntable supported on a movable carrier which is actuable to move the turntable into and out of a housing, and having a tone arm which is movable across the surface of a record and controllable to play back at least a selected one of plural programs recorded on the record in separate segments which are spaced apart from each other by respecting inter-program gaps. An inter-program gap detector detects the location of each inter-program gap on the record and produces an inter-program gap signal representing that location as the carrier moves the turn-table into the housing. A selector is provided for selecting a prgram to be played by selecting a particular inter-program gap signal which represents the location on the record of the desired program. A tone arm position detector detects the position of the tone arm as it moves across the surface of the record and produces a tone arm position signal representing the relative position of that tone arm. A control circuit compares the tone arm position signal to the selected inter-program gap signal and produces a control signal when the tone arm position signal corresponds to the selected inter-program gap signal so as to cause the tone arm to play back the selected program.

9 Claims, 5 Drawing Figures

RECORD PLAYER PROGRAM SELECTOR

BACKGROUND OF THE INVENTION

This invention relates to an automatic program selector for a record player and, more particularly, to an electronic program selector which is particularly adapted for use in a record player of the type having a turntable which is driven into and out of a protective housing.

In a typical phonograph record of the so-called long-playing type, a multiple of selections, or programs are recorded in a surface of the record disc. Each program is recorded in a spiral groove, referred to as a sound groove, having undulations representing sound signals, which sound signals are sensed by a stylus which rides in the groove and which vibrates in response to such undulations. Typically, the selections, or programs, are spaced from each other by gaps on the record, which gaps are substantially free of sound grooves. Hence, at the completion of one program, the stylus, which is supported by a tone arm, advances through the gap to the next-following program, and this next program then is played back.

In record players that are not provided with automatic program selector apparatus, any desired program may be played back merely by having the user lift the tone arm from the surface of the disc and advance, or move that tone arm to a desired program which is identified by the usual record information label which indicates the particular gap that precedes the desired program. This, of course, requires the user to count the gaps until the proper gap is located.

In an effort to provide automatic program selector apparatus, record players have been designed with selector switches, each switch being associated with a respective gap, and the desired program is played back by actuating the proper switch so as to drive the tone arm automatically to the selected gap. In one type of program selector, a sensor is provided for sensing the presence and absence of the usual sound groove, thereby detecting the location of each inter-program gap (i.e. the gap which separates adjacent programs). Typically, the sensor is disposed in the same pick-up cartridge that houses the stylus and pick-up coil. In order to accommodate the sensor, the physical size of the cartridge must be sufficiently large or, alternatively, the so-called "head shell" which supports the cartridge must be made relatively large. In addition to housing the sensor, the cartridge or head shell also must accommodate the necessary electrical terminals and conductors which electrically interconnect the sensor to control electronics. Because of this large size of the cartridge, it is not readily interchangeable with conventional, commercially available cartridges. Hence, the user who periodically replaces the cartridge because of normal wear is limited as to available replacements. This increases the usual maintenance cost associated with the record player.

In order to provide automatic program selector apparatus that is usable with conventional, readily available record player cartridges, a relatively complicated mechanical arrangement has been proposed in order to sense the locations of the inter-program gaps on the record. For example, in one type of mechanical arrangement, a pivotable sensor arm is provided, independently of the tone arm, and is adapted to move, or scan, across the surface of the record. The sensor arm is provided with a sensor for sensing each location of the inter-program gap as the sensor arm scans the record. Since the surface of the record exhibits different reflectivity coefficients at those portions containing sound grooves and those portions which are free of such sound grooves (i.e. the inter-program gap), the sensor may comprise a photodetector which detects this change in reflectivity so as to sense each inter-program gap. As an example, the photodetector may comprise a light source for directing a light beam onto the surface of the record disc and an optical detector for detecting the intensity of the reflected beam. An increase in intensity due to the reflection of the beam from the inter-program gap is sensed to identify the location of that gap.

The aforedescribed sensor arm also is provided with a mechanism by which the relative position thereof with respect to the record is indicated. For example, a counter mechanism may be provided, the count of the counter mechanism being incremented as the sensor arm scans the record. Thus, the count of the counter mechanism represents the relative position of the sensor arm with respect to the record. As one example of the counting mechanism, an index or scale, such as a grid having indicia thereon, cooperates with a pick-up device for sensing the indicia, whereby each sensed indicium increments the count of a counter. The pick-up device may comprise a photo-detector or, alternatively, if the indicia is formed of discrete magnetic elements, the pick-up device may comprise a conventional magnetic detector.

As the sensor arm scans the record, the aforementioned counter produces a count which represents the relative position of that arm with respect to the record. A suitable storage device is provided with the instantaneous count of the counter whenever an inter-program gap is sensed. Thus, the relative locations of each inter-program gap are stored.

After the sensor arm is driven to scan the record, a program selector switch is operated to initiate a similar scanning operation of the tone arm. The tone arm is coupled to a counting mechanism similar to that provided on the sensor arm so as to provide an indication of the relative location of the tone arm as it scans across the record. When the tone arm count corresponds to the selected sensor arm count, thus representing that the relative position of the tone arm is equal to the selected location of the desired inter-program gap, the tone arm drive mechanism then drives the tone arm into engagement with the record so as to play back the program which follows the selected inter-program gap.

The aforedescribed program selector apparatus which employs the separate sensor arm is relatively complicated and, thus, substantially increases the cost of the record player with which it is used. Furthermore, a selected program cannot be played back until after the sensor arm completes its scan of the record. This delay in playing back the selected program is undesirable.

OBJECTS OF THE INVENTION

Therefore, it is an object of the present invention to provide improved program selector apparatus for a record player which avoids the aforenoted disadvantages and problems; is relatively inexpensive to implement; and enables a rapid selection of any desired program for playback.

Another object of this invention is to provide a program selector apparatus for a record player of the type having a turntable supported on a movable carrier which serves to insert the turntable into and withdraw it from a protective housing.

A further object of this invention is to provide a program selector apparatus for a record player wherein inter-program gaps on the surface of a record are detected and a selected one of such gaps is located by the tone arm which advances thereto and plays back the program material recorded therefrom.

Various other objects, advantages and features of the present invention will become readily apparent from the ensuing detailed description, and the novel features will be particularly pointed out in the appended claims.

SUMMARY OF THE INVENTION

In accordance with this invention, program selector apparatus is provided for a record player of the type having a turntable supported on a movable carrier which is actuable to move the turntable into and out of a housing. The record player has a tone arm which is movable across the surface of a record and is controllable to play back a selected one of plural programs which are recorded on the record, the programs being recorded in separate segments spaced apart from each other by respective inter-program gaps. An inter-program gap detector detects the location of each inter-program gap on the record and produces an inter-program gap signal to represent the location of that gap, as the carrier drives the turntable into the housing. A selector is operable to select a program to be played back by selecting an inter-program gap signal representing the location on the record of the selected program. A tone arm position detector detects the position of the tone arm as it moves across the surface of the record and produces a tone arm position signal representing the instantaneous position of the tone arm along the record. Control circuitry compares the tone arm position signal to the selected inter-program gap signal to produce a control signal when the compared signals correspond to each other, thereby causing the tone arm to play back the selected program.

In accordance with one aspect of this invention, the inter-program gap detector is comprised of a photodetector mounted on the housing and adapted to discriminate between recorded program information and inter-program gaps. As the carrier drives the turntable into the housing, a counter is incremented; and the count then present in the counter at the time that the photodetector senses an inter-program gap is stored as an inter-program gap signal. Another counter is incremented when the tone arm is driven across the surface of the record; and when the count of this other counter equals a stored count, thus representing that the tone arm has reached the selected inter-program gap, the tone arm is brought into engagement with the record to play back the selected program.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
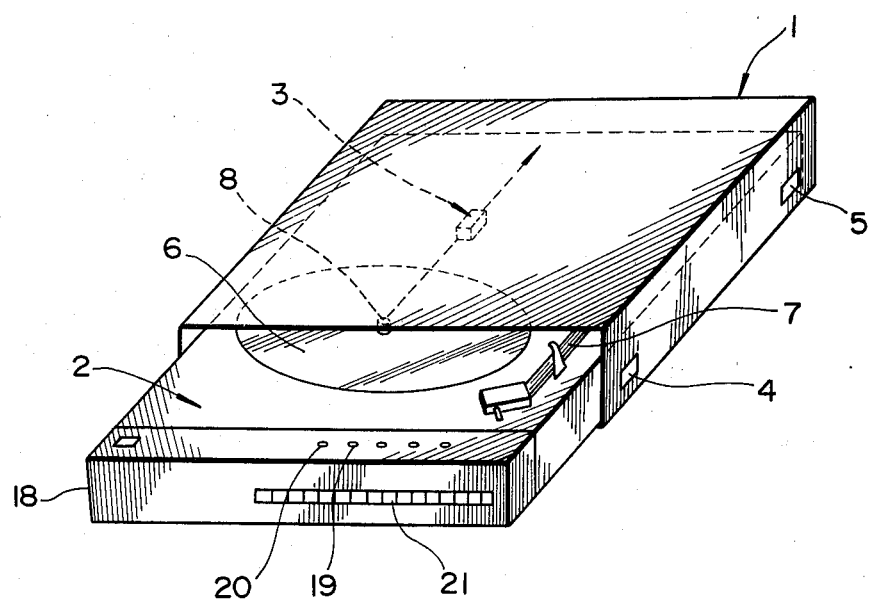
FIG. 1 is a perspective view of a record player in which the program selector of the present invention is used.
Figure 2:
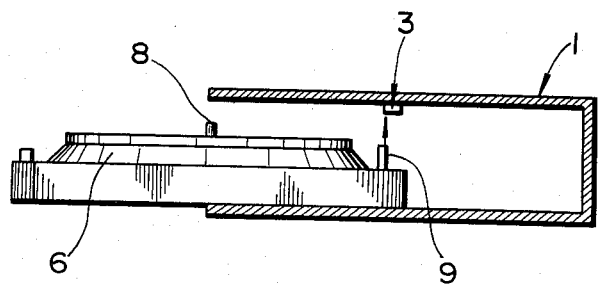
FIG. 2 is a sectional side view of the apparatus shown in FIG. 1.
Figure 3:
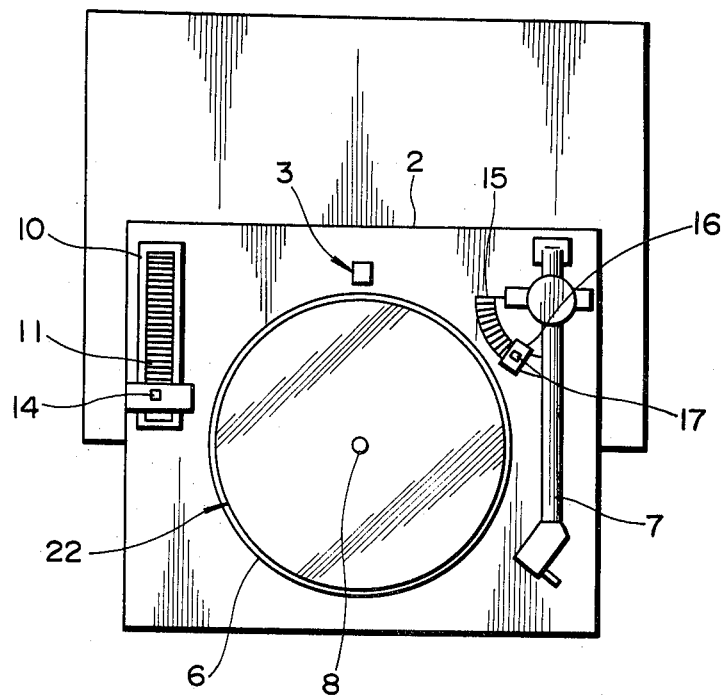
FIG. 3 is a top view of the apparatus shown in FIG. 1.

Referring now to the drawings, wherein like reference numerals are used throughout, and in particular to FIGS. 1-3 thereof, there is illustrated a record player in which the program selector apparatus of the present invention is incorporated. The illustrated record player is adapted to play back programs recorded on, for example, a phonograph disc. The record player is comprised of a housing 1 which is adapted to receive a carrier 2 upon which a turntable 6 and a tone arm 7 are mounted. In one embodiment, a suitable drive motor (not shown) is selectively energizable to withdraw carrier 2 from housing 1, and to retract the carrier into the housing. In accordance with another embodiment, carrier 2 is supported on suitable rollers and is manually withdrawn from and retracted into housing 1. In either embodiment, as the carrier is driven, or moved, turntable 6 (and also tone arm 7) likewise is moved into and out of housing 1.

Limit switches 4 and 5 are disposed within housing 1 and are fixed with respect to the movement of carrier 2. These limit switches are adapted to be actuated by suitable actuators (not shown) coupled to carrier 2 when the carrier reaches its fully withdrawn or fully retracted positions. For example, limit switch 4 is actuated when the carrier is fully withdrawn, and limit switch 5 is actuated when the carrier is fully retracted. In addition, a control panel 18 (FIG. 1) is provided at the front portion of carrier 2, this control panel being provided with suitable switches, some of which are illustrated as switches 19, 20 and 21. As an example, switch 19 may be actuated to energize a motor (not shown) so as to drive carrier 2 out of housing 1. Switch 20 may be actuated to energize that motor so as to return the carrier to the housing. Switches 21 are referred to herein as selector switches, each of which being selectively actuable to select a particular one of several programs that may be recorded on a record that is placed upon turntable 6. It will be appreciated that, advantageously, a record is placed upon or removed from turntable 6 when carrier 2 has been withdrawn from housing 1 and the record placed upon turntable 6 is played back by tone arm 7 when carrier 2 is retracted into the housing. The mechanism for driving carrier 2 and the apparatus used to played back a program from the record, form no part of the present invention per se and, in the interest of brevity, are not shown or described herein.

As mentioned above, respective programs are recorded in separate segments on the phonograph record, which segments are spaced apart from each other by respective inter-program gaps. Such inter-program gaps are disposed at respective locations along a radius of the record. Recorded information is, of course, recorded in sound grooves, and the inter-program gaps are free of sound grooves and may be provided merely with a guide groove to guide the usual stylus from one program to the next. The reflectivity of the surface of the record due to the sound grooves differs from the reflectivity of the surface thereof due to the inter-program gaps. Accordingly, the sound grooves and inter-program gaps may be optically discriminated by a suitable photodetecting device. To this effect, a sensor 3, which, preferably, comprises a photosensor, is mounted on the interior of housing 1. Sensor 3 is fixedly disposed relative to carrier 2 such that, when the carrier moves turntable 6 into housing 1, sensor 3 is in alignment with the radius of a record on the turntable. Hence, the sensor optically scans this radius to detect the location therealong of each inter-program. As will be described below, sensor 3 includes a source of light for transmitting a light beam to the surface of the record and a photosensor, such a phototransistor, disposed to receive the light beam reflected from the surface of the record. A change in the intensity of the reflected beam caused by reflection from the inter-program gap is detected and used to produce an output sense signal representing the occurrence, or sensing, of the inter-program gap.

As illustrated in FIG. 2, a reference indicator, such as a pin 9, is mounted on carrier 2 and disposed in an upright position. As the carrier retracts into housing 1, the passage of pin 9 beneath sensor 3 is detected, for a purpose soon to be described. It is appreciated, therefore, that pin 9 is positioned in alignment with the radius of the record that is scanned by sensor 3.

It will be understood that, in addition to sensing pin 9 and the respective inter-program gaps on the record, sensor 3 also functions to detect the leading edge, or periphery, of the record. The so-called "lead-in" groove of a conventional phonograph record is substantially similar to the aforedescribed inter-program gap and, thus, is readily detected by sensor 3.

As thus far described, it is appreciated that, when carrier 2 moves turntable 6 into housing 1, fixed sensor 3 scans along the radius (and extension of that radius) of the record on the turntable. When pin 9 passes beneath sensor 3, and when the lead-in groove and respective inter-program gaps pass beneath the sensor, output sense signals are produced thereby to indicate the occurrence, or presence of such pin, groove and gaps. In accordance with one aspect of the present invention, the relative locations of the lead-in groove and inter-program gaps are detected. In particular, a counter is actuated, as will be described, such that the count thereof changes as carrier 2 is moved a predetermined incremental distance. The output sense signal produced by sensor 3 in response to the detection of pin 9 is used to reset the counter; and thereafter, each output sense signal is used to store the particular count then present in the counter. Each stored count thus represents the particular location along the radius of the record, relative to reference pin 9, at which the lead-in groove and each inter-program gap is located. It is recognized that the count which is stored when the lead-in groove is detected advantageously represents the size (i.e. diameter) of the record on turntable 6. In particular, this count, which is referenced from the detection of reference pin 9, is inversely related to the size of the record. In addition, if a record is not placed upon turntable 6, it is seen that, following the detection of reference pin 9, sensor 3 will not produce an output sense signal. Hence, when carrier 2 is retracted into housing 1, a suitable indication may be provided (not shown) representing the presence or absence of a record disc.

One embodiment of the apparatus which is used to increment a suitable counter as carrier 2 is retracted into housing 1 is illustrated in FIG. 3. This apparatus is comprised of an index 10, such as a suitable scale, having indicia marked thereon. Index 10 may, for example, be formed as a grid plate having optically detectable grid markings disposed thereon. Alternatively, index 10 may be provided with an array of spaced apart magnetic elements. Still further, the index may be provided with a series of spaced apart detents. Regardless of the particular construction of index 10, the indicia (e.g. the optically detectable grid marks, the magnetic elements or the detents) are sensed by a suitable pick-up 14. The pick-up and index are movable relative to each other such that, as carrier 2 is retracted, pick-up 14 scans the indicia on index 10 to generate successive output pulses. In one embodiment, pick-up 14 is mounted on carrier 2 and index 10 is fixed, and may be secured to, for example, the interior of housing 1. Thus, as carrier 2 is moved, pick-up 14 moves therewith to scan the indicia on index 10.

Figure 4:
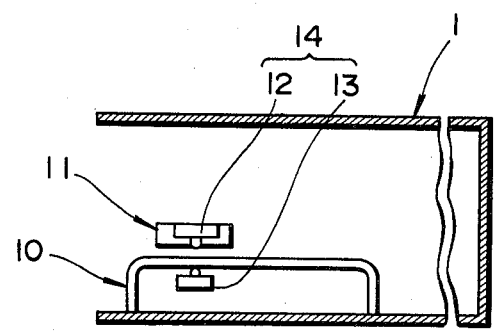
FIG. 4 is a sectional view of a portion of the apparatus shown in FIG. 3.

For the embodiment wherein index 10 is provided with optically detectable indicia, pick-up 14 includes a source of light 12, such as a conventional light-emitting device, disposed above one surface of index 10, and an optical sensor, such as a conventional photosensor 13, in alignment with light source 12 and disposed beneath the undersurface of index 10, as illustrated in FIG. 4. Light source 12 may be housed within a suitable housing 11 having an aperture, such as a slit that is substantially coextensive with the indicia on index 10, through which light from light source 12 passes to photosensor 13. As each indicium passes between light source 12 and photosensor 13, the photosensor produces an output pulse indicative thereof. These output pulses are referred to as count pulses and, as will be described, are counted by a suitable pulse counter.

For the embodiment wherein index 10 is provided with an array of spaced apart magnetic elements, pick-up 14 may comprise a suitable magnetic sensor adapted to produce a count pulse when each magnetic element is sensed. In the further embodiment wherein index 10 is provided with a series of spaced-apart detents, pick-up 14 may include a wiper element adapted to ride along index 10 and to sense each detent therein, thereby actuating a suitable switch to produce a corresponding count pulse.

It is appreciated, therefore, that as carrier 2 is moved into and out of housing 1, pick-up 14 generates a train of count pulses as the carrier moves by a predetermined incremental amount.

As illustrated in FIG. 3, tone arm 7 is provided with similar apparatus to generate count pulses as the tone arm scans across the surface of record 22 on turntable 6. It is recognized that the tone arm may be driven by a suitable motor (not shown) while the stylus is elevated above record 22, thereby driving the stylus in the substantially radial direction across the record. In the vicinity of the pivot axis of tone arm 7, there are provided an index 15 and a pick-up 17 which may be similar to aforementioned index 10 and pick-up 14, respectively. Index 15 and pick-up 17 are movable relative to each other such that, as tone arm 7 scans across the surface of record 22, a train of count pulses is generated by pick-up 17. As one example, index 15 may be fixed, as by being secured to carrier 2, and pick-up 17 may be coupled, as by a suitable housing 16, to tone arm 7. Alternatively, this arrangement may be interchanged, whereby pick-up 17 may be fixed and index 15 may be coupled to and movable with the tone arm. In either embodiment, it is appreciated that, as the tone arm 7 pivots about its pivot axis, a train of count pulses is generated by pick-up 17. These pulses are counted, as will be described, such that the count generated in response thereto represents the relative position of tone arm 7 along the radius of record 22.

Preferably, the separation between adjacent indicia on index 10 is equal or proportional to the separation between adjacent indicia on index 15, such that the count pulses generated by pick-ups 14 and 17 represent substantially equal incremental distances. That is, the same number of pulses are generated by pick-up 14 when carrier 2 is fully retracted as are generated by pick-up 17 when tone arm 7 is fully rotated towards spindle 8 of turntable 6.

Figure 5:
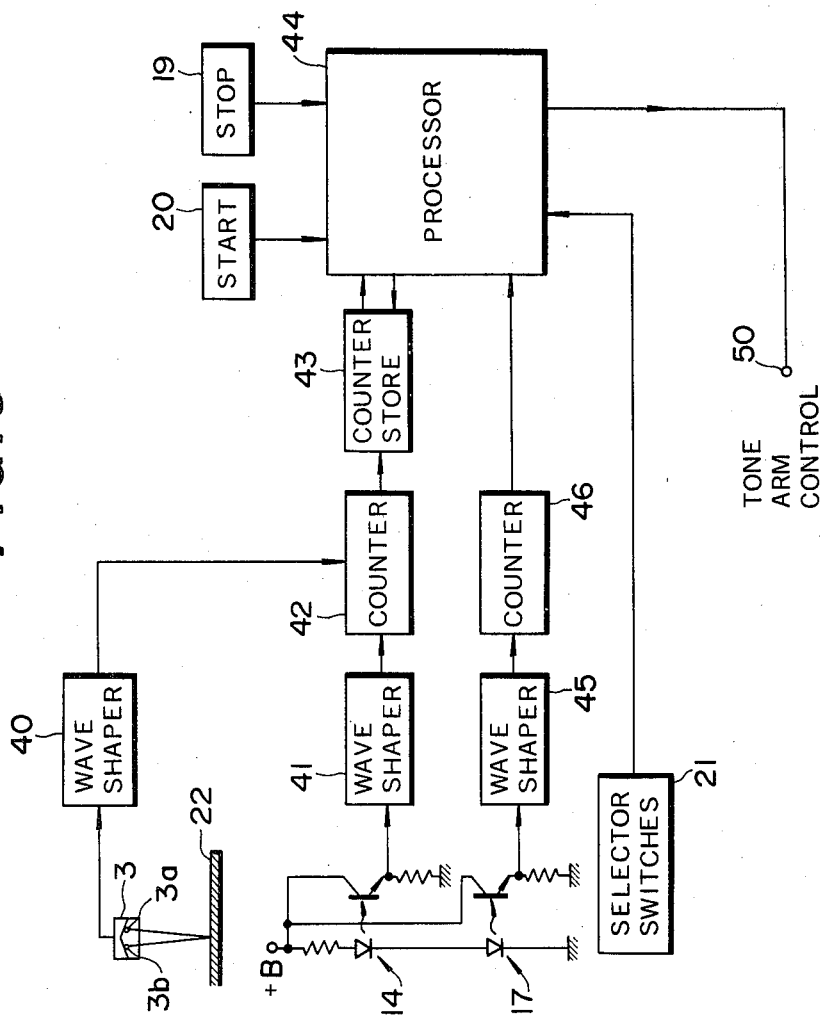
FIG. 5 is a block diagram of the electronic circuitry included in the program selector apparatus of the present invention.

The manner in which sensor 3, pick-up 14 and pick-up 17 cooperate to permit the desired program to be played now will be described with reference to the block diagram shown in FIG. 5. The apparatus shown in FIG. 5 is comprised of a counter 42, a counter store 43, another counter 46 and a processor, or control circuit 44. Counter 42 is supplied with count pulses generated by pick-up 14 as carrier 2 moves into and out of housing 1, as described above. As illustrated, pick-up 14 is comprised of a light emitting diode in combination with a photosensor, the latter generating a count pulse in response to each indicium sensed on index 10. The count pulses thus generated by pick-up 14 are coupled to counter 42 via a wave shaping circuit 41. It will be appreciated that the wave shaping circuit functions merely to shape the count pulses to a predetermined configuration.

Counter 42 includes a control input coupled to sensor 3 via a wave shaping circuit 40. This control input is adapted to receive a shaped output sense signal produced by sensor 3 in the manner described hereinabove. In response to this output sense signal, the contents of counter 42 are transferred to a respective register included in counter store 43.

Counter store 43 includes a plurality of registers, such as eight registers, each being individually selected, in order, and each adapted to receive and store the count transferred thereto from counter 42. For example, after the first register included in counter store 43 is supplied with a count, referred to herein as a count signal, the next-following register therein is selected to receive the next count signal from counter 42.

Counter 46 is similar to counter 42 and is coupled to pick-up 17 via a wave shaping circuit 45. Pick-up 17 is illustrated as being comprised of a light emitting diode in combination with a photosensor, the latter generating a count pulse in response to each detected indicium on index 15. Hence, as tone arm 7 radially scans across record 22, pick-up 17 generates count pulses which, after being shaped by wave shaping circuit 45, are counted by counter 46.

Processor 44 is coupled to counter store 43 and counter 46 and, in addition, receives signals generated by switch 19, switch 20 and a selected one of selector switch 21. Processor 44 may be formed of a microprocessor and is programmable by those of ordinary skill in the art to function in the manner described below.

The processor controls the operation of the record player and is coupled to various output terminals, one of which is illustrated as control terminal 50. Processor 44 functions, in response to the actuation of START switch 20, to generate suitable control signals whereby carrier 2 is driven into housing 1. The processor also functions in response to the actuation of STOP switch 19 to withdraw the carrier from the housing. In addition, the processor may produce a "lift" signal in response to the actuation of STOP switch 19 so as to remove tone arm 7 from its playback relationship with respect to record 22 prior to driving carrier 2 out of housing 1.

Still further, processor 44 is responsive to the actuation of a particular selector switch 21 to advance tone arm 7 to the proper position along record 22 so as to play back the selected program.

The manner in which the circuitry illustrated in FIG. 5 operates now will be described. Let it be assumed that START switch 20 is actuated. In response thereto, processor 44 energizes the appropriate motor (not shown) to drive carrier 2 into housing 1. As the carrier retracts into the housing, pin 9 is sensed by sensor 3, resulting in an output sense signal which is shaped by wave shaping circuit 40 and supplied to counter 42 to reset this counter to a predetermined count, such as a count of zero. As carrier 2 retracts into housing 1, the indicia on index 10 are sensed by pick-up 14. In response to each sensed indicium, the pick-up supplies a count pulse to counter 42 via wave shaping circuit 41. Hence, the count of counter 42 is incremented as carrier 2 retracts. It is appreciated that, since the indicia are spaced apart by a predetermined amount corresponding to a predetermined incremental movement of carrier 2, the instantaneous count of counter 42 represents the relative position of turntable 6 with respect to sensor 3. When the leading edge of record 22 is sensed by sensor 3, counter 42 is triggered thereby to transfer the count then present therein to, for example, the first register included in counter store 43. Hence, the count present in this first register represents the distance that carrier 2 has advanced until the leading edge of record 22 has been detected. That is, this count represents the size (as a function of the radial distance from reference pin 9 to the leading edge of the record) of record 22.

As carrier 2 continues to retract, the count of counter 42 continues to increase. When the first inter-program gap on record 22 is sensed by sensor 3, counter 42 is triggered thereby to transfer the count then present therein into the next register of counter store 43. This count represents the location of the inter-program gap on record 22 relative to reference pin 9. Thereafter, as carrier 2 continues to be retracted into housing 1, counter 42 continues to increment; and each detected inter-program gap is used to transfer the count therein to the next respective one of the registers included in counter store 43. Thus, when the carrier has been fully retracted, the respective registers of counter store 43 store counts which represent the respective locations of the leading edge of record 22 and each inter-program gap thereon.

A suitable selector switch 21 then is actuated by the user. For example, let it be assumed that the user wishes to play back the third program recorded on record 22. This is achieved by, for example, operating the third switch included in selector switch 21. Processor 44 responds to the actuation of this selector switch to select the contents of the third storage register included in counter store 43. Thus, the operation of this particular selector switch serves to select the count stored in counter store 43 which represents the location on record 22 of the desired program.

The actuation of the selector switch also energizes a suitable motor (not shown) to drive tone arm 7 across the surface of record 22. As the tone arm scans substantially along a radius of the record, pick-up 17 generates successive count pulses in the manner described above.

These pulses increment counter 46. Processor 44 functions to compare the increasing count of counter 46 to the count of the selected register (i.e. the third register) included in counter store 43. It is appreciated that the count of counter 46 will be equal to the selected count when tone arm 47 advances to that location on record 22 whereat the selected program is recorded. The processor includes a comparator circuit for comparing these counts; and when they are equal, processor 44 produces a tone arm control signal at output terminal 50. This tone arm control signal lowers the tone arm to the surface of record 22, whereupon the selected program is played back.

It is clear, from the foregoing description, that the counts stored in counter store 43 are inter-program gap signals which represent the respective locations on record 22 whereat the inter-program gaps are located. Likewise, the incrementing count of counter 46 is a tone arm position signal which represents the instantaneous position of the tone arm as it scans radially across record 22. When the tone arm position signal corresponds to the selected inter-program gap signal, processor 44 produces the tone arm control signal to lower the tone arm onto the record so as to play back the selected program therefrom. The counts stored in the respective registers of counter store 43 may be thought of as being the addresses of corresponding inter-program gaps. Likewise, the incrementing count of counter 46 may be thought of as being the instantaneous address of the relative position of tone arm 7 with respect to record 22.

In the aforedescribed operation, tone arm 7 is driven in response to the actuation of a selector switch 21. Alternatively, the selector switch may be actuated at any time, such as prior to, during or after carrier 2 retracts into housing 1; and tone arm 7 may be driven in response to the actuation of, for example, limit swtich 5. It is recalled that this limit switch is actuated when carrier 2 is fully retracted into the housing.

Although forming no part of the present invention per se, in one mode of operation of the illustrated record player, after the selected program has been played and the next inter-program gap is reached by tone arm 7, or if the last program is played and tone arm 7 reaches the "lead-out" groove, the tone arm may be returned automatically to its rest position. The apparatus then awaits the operation of another selector switch so that the next-selected program can be played back. Alternatively, after a selected program has been played back, the tone arm may continue to play back the remaining programs on the record disc.

In one embodiment, only a single program is selected to be played back. In another embodiment, selector switches 21 are actuated in a desired sequence, and the registers included in counter store 43 are selected in that same sequence so that the inter-program gap signals therein are compared, in that sequence, to the tone arm position signal then present in counter 46. In this manner, the selected programs are played back in the operator-initiated sequence.

While the present invention has been particularly shown and described with reference to a preferred embodiment, it should be readily apparent to those of ordinary skill in the art that various changes and modifications in form and details may be made without departing from the spirit and scope of the invention. Some of these changes and modifications have been discussed above. Others will be readily apparent to those of ordinary skill in the art. It is intended, therefore, that the appended claims be interpreted as including all of such changes and modifications.

What is claimed is:

1. Program selector apparatus for a record player of the type having a turntable supported on a movable carrier which is actuable to move the turntable into and out of a housing, and having a tone arm which is movable across the surface of a record on said turntable and controllable to play back a selected one of plural programs recorded on said record in separate segments spaced apart from each other by respective inter-program gaps, said apparatus comprising:
    inter-program gap detecting means for detecting the location of each inter-program gap on said record and for producing an inter-program gap signal representing said location as said turntable is moved into said housing;
    selecting means for selecting a program to be played back, said selecting means selecting an inter-program gap signal representing the location on said record of said selected program;
    tone arm position detecting means for detecting the position of said tone arm as said tone arm moves across the surface of said record and for producing a tone arm position signal representing the position of said tone arm along said record; and
    control means for comparing said tone arm position signal to said selected inter-program gap signal and for producing a control signal in response to said comparison to cause said tone arm to play back the selected program.

2. The apparatus of claim 1 wherein said inter-program gap detecting means comprises counting means for generating counts as said turntable is moved into said housing; sensing means for sensing the inter-program gaps on said record; and storage means for storing the count generated by said counting means when an inter-program gap is sensed; the stored count representing the location of a respective inter-program gap.

3. The apparatus of claim 2 further comprising reference means on said carrier and sensible by said sensing means when said carrier moves said turntable to a reference position; and reset means for resetting said counting means to a predetermined count when said reference means is sensed by said sensing means.

4. The apparatus of claim 2 wherein said sensing means comprises photodetecting means fixedly mounted on said housing for discriminating between recorded program information and inter-program gaps on said record, and for producing a sense signal when an inter-program gap is sensed.

5. The apparatus of claim 4 wherein said photodetecting means further produces a sense signal when the leading edge of said record is sensed thereby as said carrier moves said turntable into said housing.

6. The apparatus of claim 4 wherein said counting means comprises an index having indicia thereon; pick-up means for sensing said indicia and for generating a counting pulse in response to each sensed indicium; one of said index and pick-up means being mounted on said housing and the other being mounted on said carrier so as to be relatively movable with respect to each other; and a pulse counter coupled to said pick-up means for counting the count pulses generated thereby.

7. The apparatus of claim 6 wherein said pick-up means comprises an optical pick-up for optically sensing said indicia.

8. The apparatus of claim 4 wherein said tone arm position detecting means comprises an index having indicia thereon; pick-up means for sensing said indicia and for generating a count pulse in response to each sensed indicium; one of said index and pick-up means being coupled to and movable with said tone arm and the other being fixed with respect to said tone arm; and a pulse counter coupled to said pick-up means for counting the count pulses generated thereby to provide a tone arm position signal.

9. Program selector apparatus for a record player of the type having a turntable supported on a movable carrier which is actuable to move the turntable into and out of a housing, and having a tone arm which is movable substantially radially across the surface of a record on said turntable and controllable to play back a selected one of plural programs recorded on said record in separate segments spaced apart from each other by respective inter-program gaps, said apparatus comprising:

a sensor fixedly disposed relative to said carrier for sensing said inter-program gaps on a record as said carrier moves said turntable into said housing;

first count pulse generating means for generating first count pulses as said carrier moves said turntable into said housing, each first count pulse representing a predetermined distance of movement of said turntable;

first counter means for counting said first count pulses to produce a changeable count representing distances along a radius of said record on said turntable;

storage means for storing the count of said first counter means when each inter-program gap on said record is sensed, each stored count representing the radial location of a respective inter-program gap;

selecting means for selecting a program to be played back by selecting a stored count;

second count pulse generating means for generating second count pulses as said tone arm moves across said surface of said record, each second count pulse representing a predetermined radial distance of movement of said tone arm;

second counter means for counting said second count pulses to produce a changeable count representing distances along a radius of said record; and control means for detecting when the count of said second counter means corresponds to said selected stored count to produce a control signal for causing play back of the program recorded at the location on said record which has been reached by said tone arm.

* * * * *